US011061818B1

(12) United States Patent
Sorenson et al.

(10) Patent No.: US 11,061,818 B1
(45) Date of Patent: Jul. 13, 2021

(54) RECOVERING FROM WRITE CACHE FAILURES IN SERVERS

(71) Applicant: International Business Machines Corporation, Armonk, NY (US)

(72) Inventors: Todd C. Sorenson, Tucson, AZ (US); Trung N. Nguyen, Vail, AZ (US); Kevin J. Ash, Tucson, AZ (US); Louis A. Rasor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/820,295

(22) Filed: Mar. 16, 2020

(51) Int. Cl.
*G06F 12/0871* (2016.01)
*G06F 12/0891* (2016.01)
*G06F 12/02* (2006.01)
*G06F 9/50* (2006.01)
*G06F 11/32* (2006.01)
*G06F 11/30* (2006.01)
(Continued)

(52) U.S. Cl.
CPC ............ *G06F 12/0871* (2013.01); *G06F 1/30* (2013.01); *G06F 9/5016* (2013.01); *G06F 11/0772* (2013.01); *G06F 11/3037* (2013.01); *G06F 11/327* (2013.01); *G06F 12/0246* (2013.01); *G06F 12/0891* (2013.01)

(58) Field of Classification Search
CPC .... G06F 12/0871; G06F 1/30; G06F 11/3037; G06F 12/0891; G06F 11/327; G06F 9/5016; G06F 11/0772; G06F 12/0246
See application file for complete search history.

(56) References Cited

U.S. PATENT DOCUMENTS

| 9,423,959 B2 | 8/2016 | Dulloor et al. |
| 10,025,508 B2 | 7/2018 | Chinnakkonda Vidyapoornachary et al. |
| 2018/0239711 A1 | 8/2018 | Hanson et al. |

FOREIGN PATENT DOCUMENTS

| CN | 104932839 A | 9/2015 |
| CN | 108897634 A | 11/2018 |
| CN | 109582508 A | 4/2019 |

OTHER PUBLICATIONS

Tsao et al., "Boosting NVDIMM Performance With a Lightweight Caching Algorithm," IEEE Transactions on Very Large Scale Integration (VLSI) Systems, vol. 26, No. 8, Aug. 2018, pp. 1518-1530.
(Continued)

*Primary Examiner* — David Yi
*Assistant Examiner* — Dustin B. Fulford
(74) *Attorney, Agent, or Firm* — Zilka-Kotab, P.C.

(57) ABSTRACT

A computer-implemented method, according to one embodiment, includes: in response to experiencing a power loss event, resupplying power to NVRAM which includes a write cache. In response to detecting that the NVRAM has experienced a failure event, the NVRAM is temporarily guarded from further use. Moreover, a portion of volatile memory is allocated to serve as a temporary write cache. The allocated portion of volatile memory is also cleared. A determination is made as to whether data is present in the write cache in the NVRAM, and in response to determining that data is present in the write cache, one or more volumes in memory which correspond to the data present in the write cache in the NVRAM are marked as having experienced data loss. Furthermore, a warning is sent which indicates that data loss has been experienced by the one or more marked volumes in the memory.

20 Claims, 10 Drawing Sheets

(51) Int. Cl.
*G06F 1/30* (2006.01)
*G06F 11/07* (2006.01)

(56) References Cited

OTHER PUBLICATIONS

Anonymous, "Dynamic capacity improvement of main memory isolating DRAM/FLASH in NVDIMM-N with aided power savings," IP.com Prior Art Database, Technical Disclosure No. IPCOM000256187D, Nov. 12, 2018, 7 pages.

Arulraj et al., "Let's Talk About Storage & Recovery Methods for Non-Volatile Memory Database Systems," Proceedings of the ACM SIGMOD International Conference on Management of Data, 2015, pp. 707-722.

RECOVERING FROM WRITE CACHE FAILURES IN SERVERS

BACKGROUND

The present invention relates to data storage systems, and more particularly, this invention relates to recovering from write cache failure events experienced by servers.

The performance characteristics of random access memory (RAM) are fundamentally different from those of traditional hard disk drives (HDDs). For instance, data in RAM is typically organized in pages, each page having a size of 4, 8, 16, etc. Kilobytes (KBs). Moreover, page read operations in RAM are typically one order of magnitude faster than write operations and latency neither depends on the current nor the previous location of operations. In RAM, memory locations are also erased in blocks prior to being written to. The size of an erase block unit is anywhere from 256, to 512, or even several thousands of pages and the erase operations takes approximately one order of magnitude more time than a page program operation. Due to the intrinsic properties of RAM, data is written out-of-place, whereby a mapping table is used to map logical addresses of the written data to physical ones. This mapping table is typically referred to as the Logical-to-Physical Table (LPT).

Although different types of RAM typically exhibit the performance characteristics described above, they may react to a loss of power very differently. For instance, information stored in volatile RAM is lost when a supply power is lost, while information that is stored in non-volatile RAM (NVRAM) is maintained even in the absence of supply power.

While NVRAM is able to retain information that is stored therein despite experiencing a loss of supply power, power loss can be a common failure mode for many types of electronic components that are included in NVRAM. In other words, while the data itself may not be lost, physical components in NVRAM, e.g., such as a non-volatile dual in-line memory module (NVDIMM), may experience errors as a result of a loss of supply power.

SUMMARY

A computer-implemented method, according to one embodiment, includes: in response to experiencing a power loss event, resupplying power to NVRAM, wherein the NVRAM includes a write cache. In response to detecting that the NVRAM has experienced a failure event, the NVRAM is temporarily guarded from further use. Moreover, a portion of volatile memory is allocated to serve as a temporary write cache, and an indication is made that the temporary write cache has been allocated from volatile memory. The allocated portion of volatile memory is also cleared. A determination is made as to whether data is present in the write cache in the NVRAM, and in response to determining that data is present in the write cache in the NVRAM, one or more volumes in memory which correspond to the data present in the write cache in the NVRAM are marked as having experienced data loss. Furthermore, a warning is sent which indicates that data loss has been experienced by the one or more marked volumes in the memory.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a plurality of NVRAM blocks configured to store data, a processor, and logic integrated with and/or executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
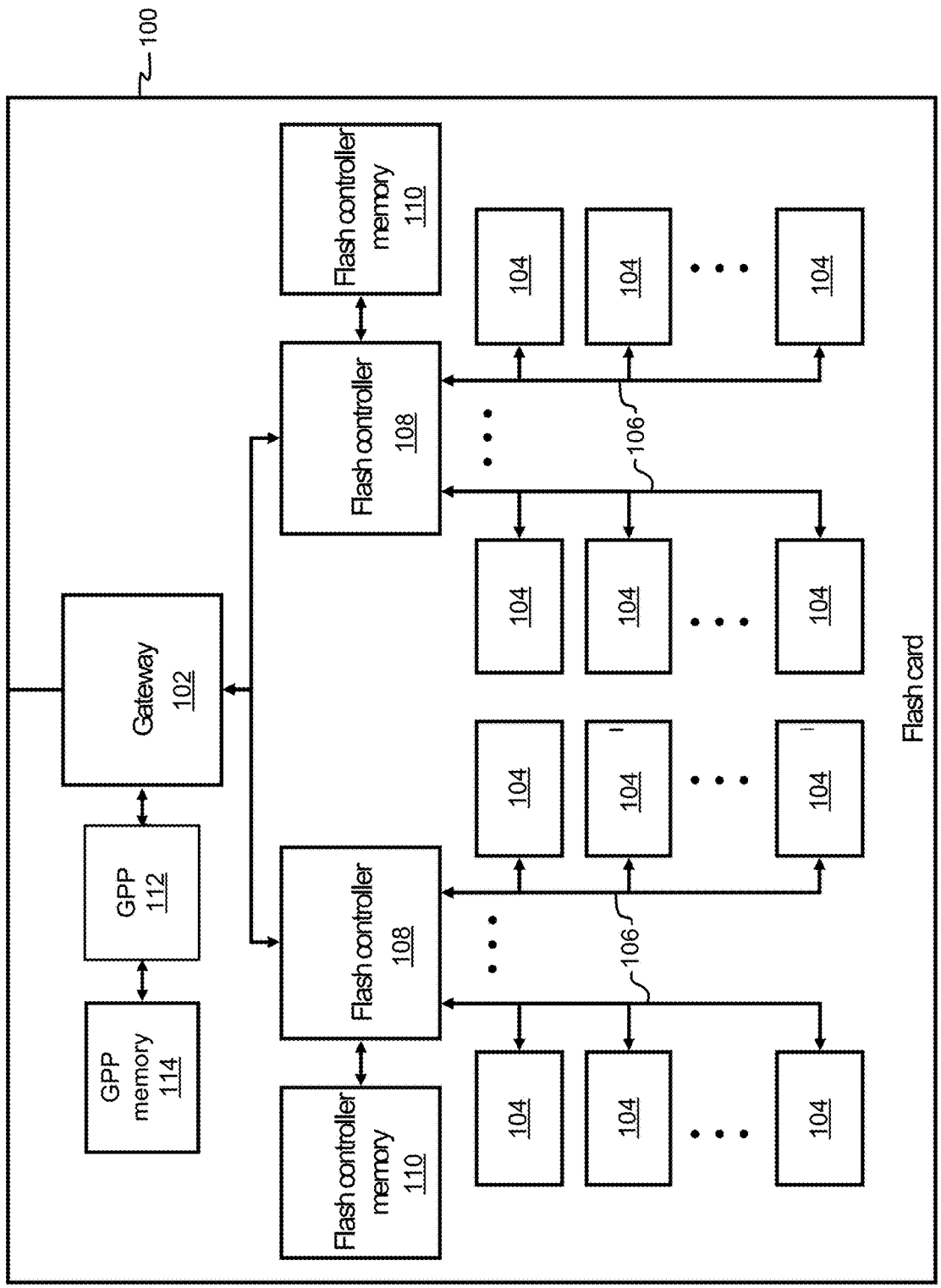
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example NVRAM technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: in response to experiencing a power loss event, resupplying power to NVRAM, wherein the NVRAM includes a write cache. In response to detecting that the NVRAM has experienced a failure event, the NVRAM is temporarily guarded from further use. Moreover, a portion of volatile memory is allocated to serve as a temporary write cache, and an indication is made that the temporary write cache has been allocated from volatile memory. The allocated portion of volatile memory is also cleared. A determination is made as to whether data is present in the write cache in the NVRAM, and in response to determining that data is present in the write cache in the NVRAM, one or more volumes in memory which correspond to the data present in the write cache in the NVRAM are marked as having experienced data loss. Furthermore, a warning is sent which indicates that data loss has been experienced by the one or more marked volumes in the memory.

In another general embodiment, a computer program product includes a computer readable storage medium having program instructions embodied therewith. The program instructions are readable and/or executable by a processor to cause the processor to: perform the foregoing method.

In yet another general embodiment, a system includes: a plurality of NVRAM blocks configured to store data, a processor, and logic integrated with and/or executable by the processor. Moreover, the logic is configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
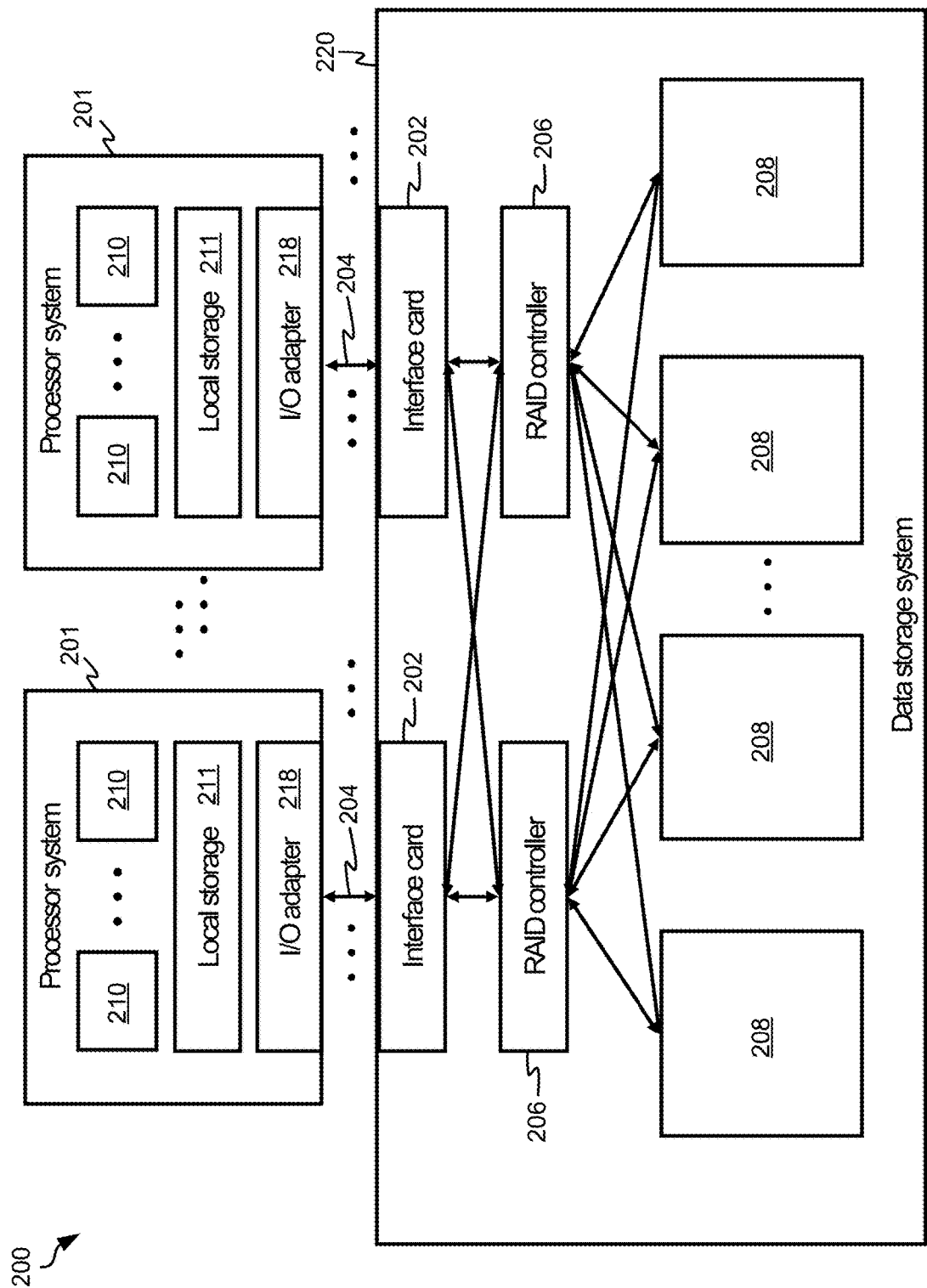
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 714 of FIG. 7, ROM 716 of FIG. 7, etc.), and an I/O adapter 218 configured to communicate with the data storage system 220.

Referring again to FIG. 1, memory controllers 108, GPP 112, and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 and/or GPP 112 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat segregation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore, the write amplification incurred by performing garbage collection is much lower for embodiments implementing heat segregation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
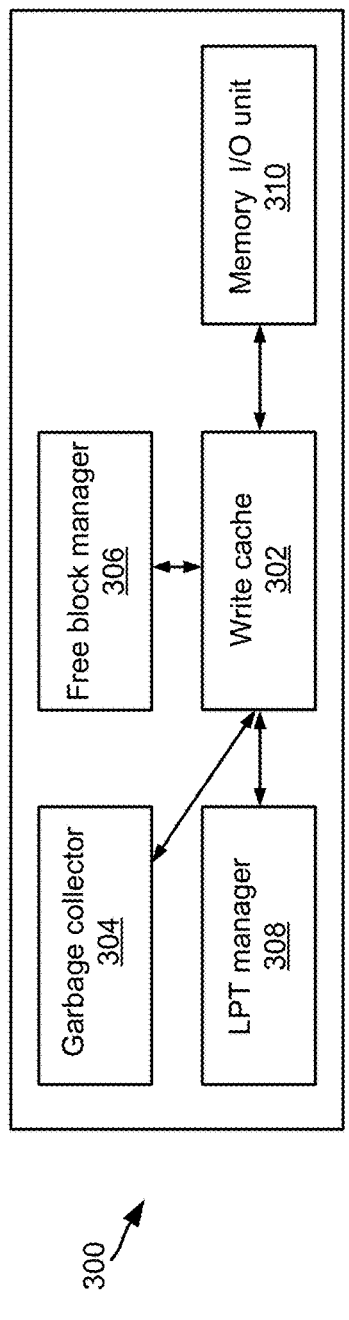
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB or 16KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
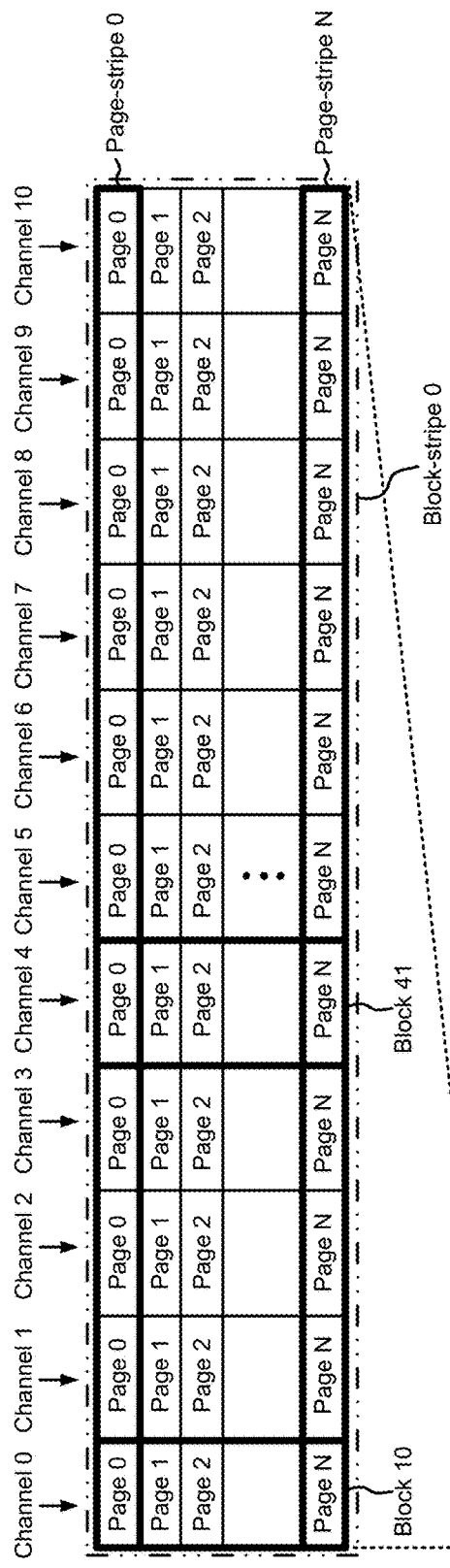
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or fewer in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, although different types of RAM typically exhibit the performance characteristics described above, they may react to a loss of power very differently. For instance, information stored in volatile RAM is lost when a supply power is lost, while information that is stored in NVRAM is maintained even in the absence of supply power.

While NVRAM is able to retain information that is stored therein despite experiencing a loss of supply power, power loss can be a common failure mode for many types of electronic components that are actually included in the NVRAM. In other words, while the data stored in NVRAM itself may not be lost, physical components in NVRAM, e.g., such as a non-volatile dual in-line memory module (NVDIMM), may experience errors as a result of a supply power cut. As a result, NVRAM may be unable to function properly even in response to being resupplied with power.

The failed components in NVRAM may thereby be unusable by the system. Without the ability to utilize these failed components or the NVRAM itself, conventional systems have been unable to recover from the power loss and return to a normal mode of operation. Moreover, any modified data which was stored in the NVRAM at the point the failure occurred has been lost in such conventional systems, as even if the failed components were repaired, data loss recovery operations (e.g., such as restoring the data from a backup) must be performed before the storage controller can restart normal operations. Thus, conventional systems have experienced data inaccessibility stemming from power losses even when NVRAM is utilized.

However, in sharp contrast to these shortcomings experienced by conventional systems, various ones of the embodiments included herein are able to significantly reduce delays experienced in regaining access to data following a loss of power. For instance, some of the approaches herein ensure that storage controllers are able to commence an initial microcode load (IML) sequence such that access to metadata stored on storage enclosure drives is achieved. This allows such approaches to determine whether any data has been lost following a power loss event, thereby allowing for a process of restoring data from storage backups to begin significantly sooner than otherwise achievable. In other words, various ones of the approaches included herein include processes which ensure the steps involved with recovering from a power loss are performed such that data loss can be detected prior to replacement of failed components in NVRAM. In many cases it may take hours or even days before components are available for replacement, and therefore it is desirable from a customer perspective to begin a data restoration process, e.g., using a redundant server in the same system, such that host applications can restore operations as soon as possible.

Figure 5:
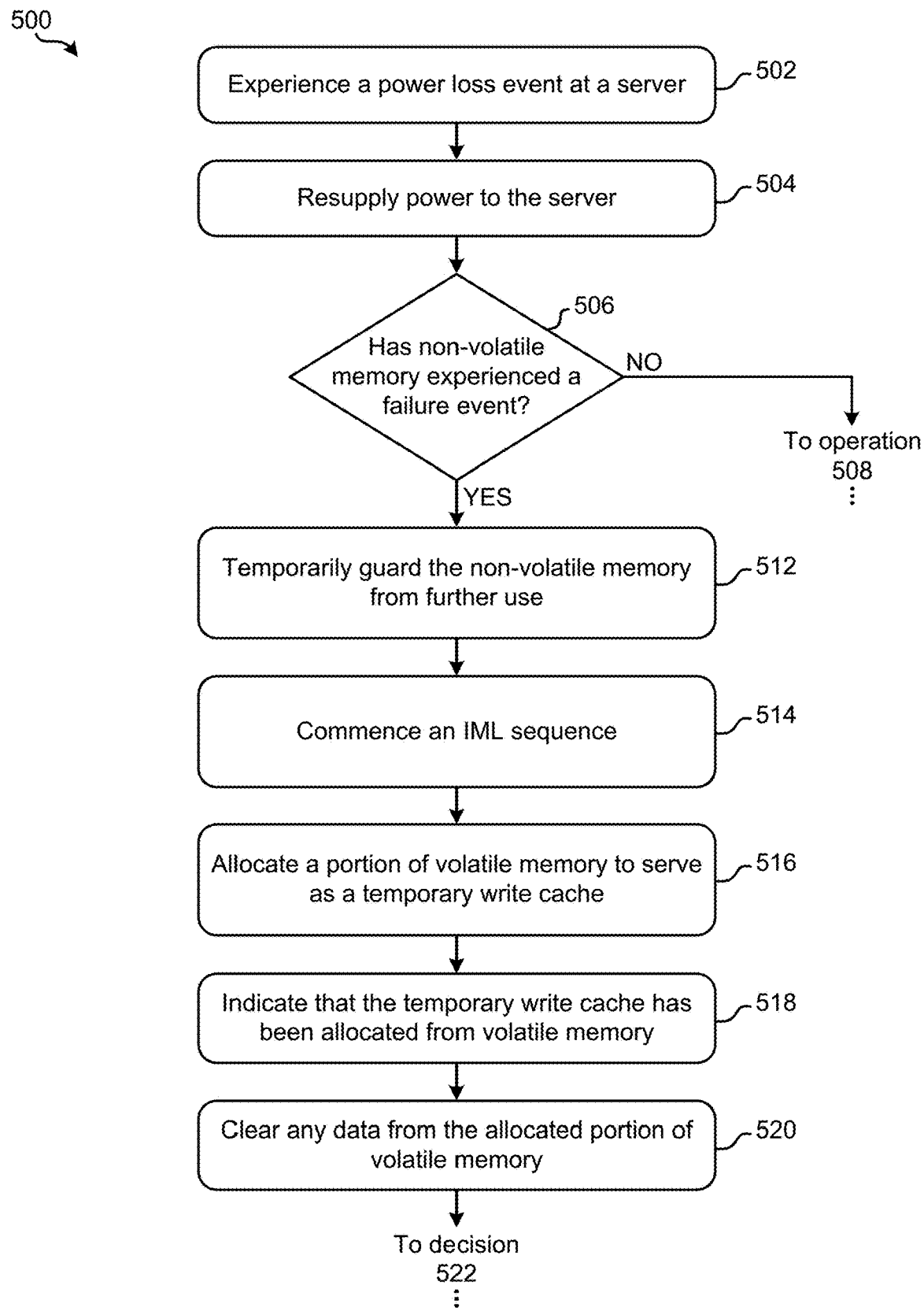
FIG. 5 is a flowchart of a method, in accordance with one embodiment.
Figure 5:
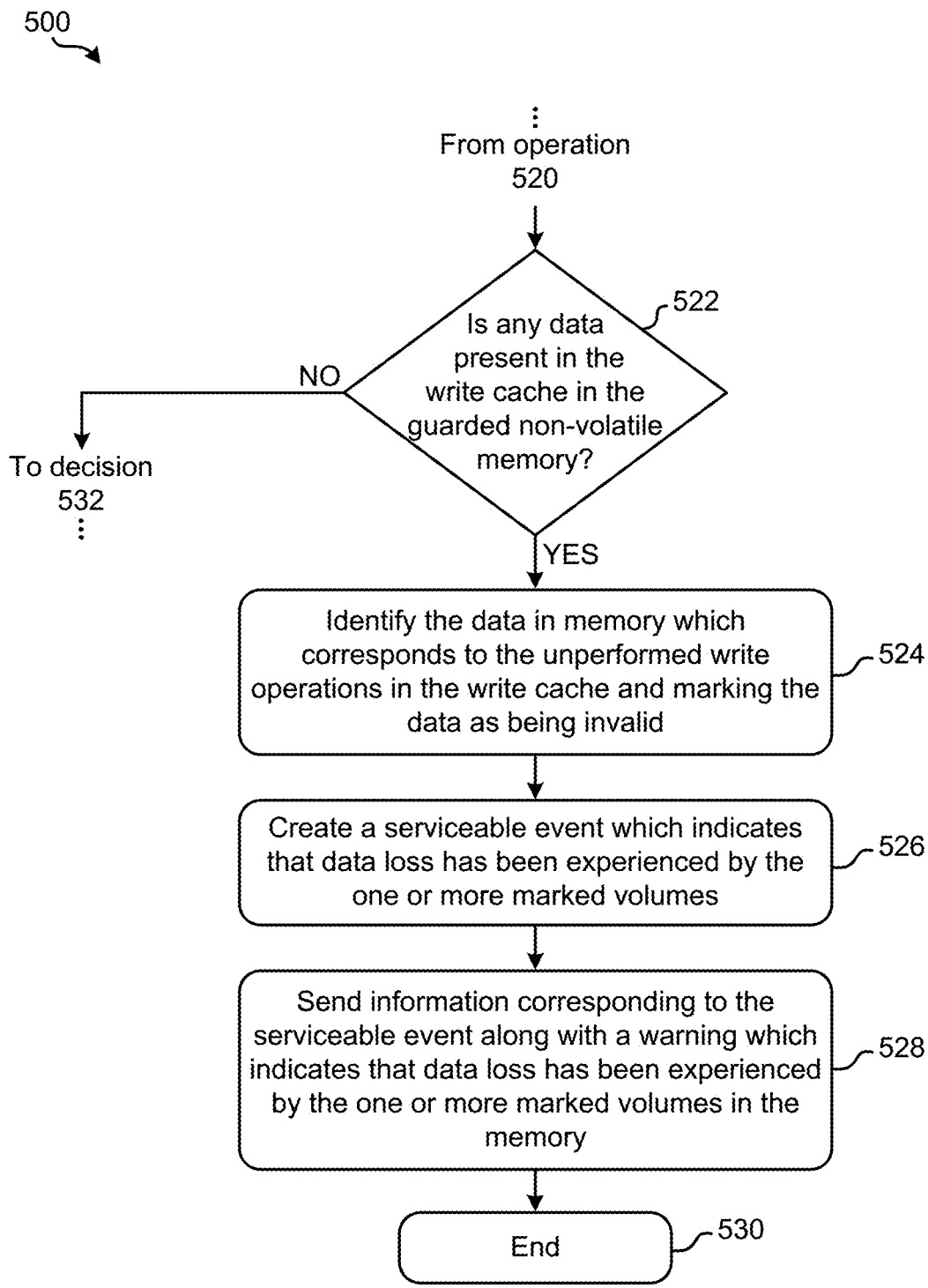
Figure 5:
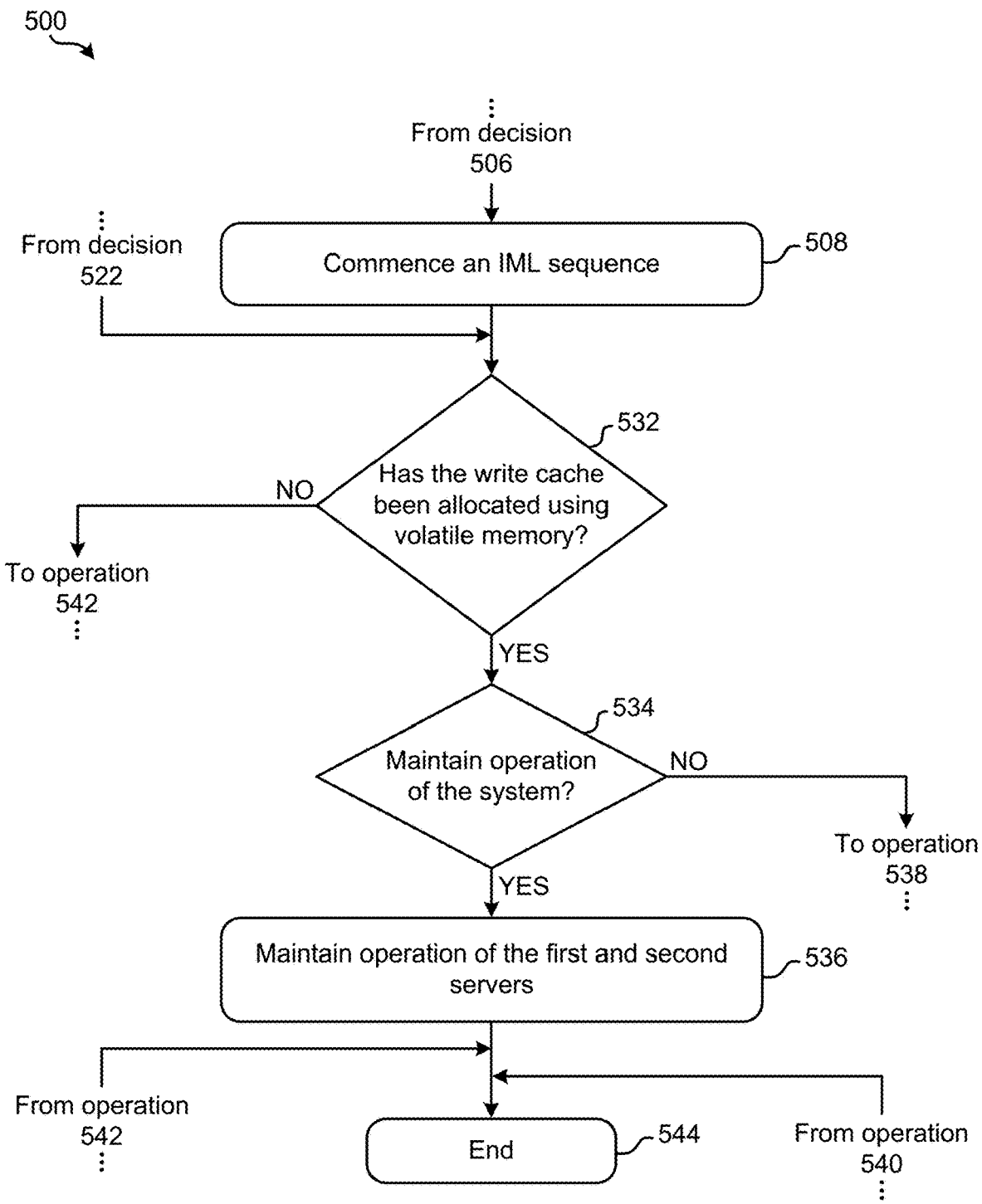
Figure 5:
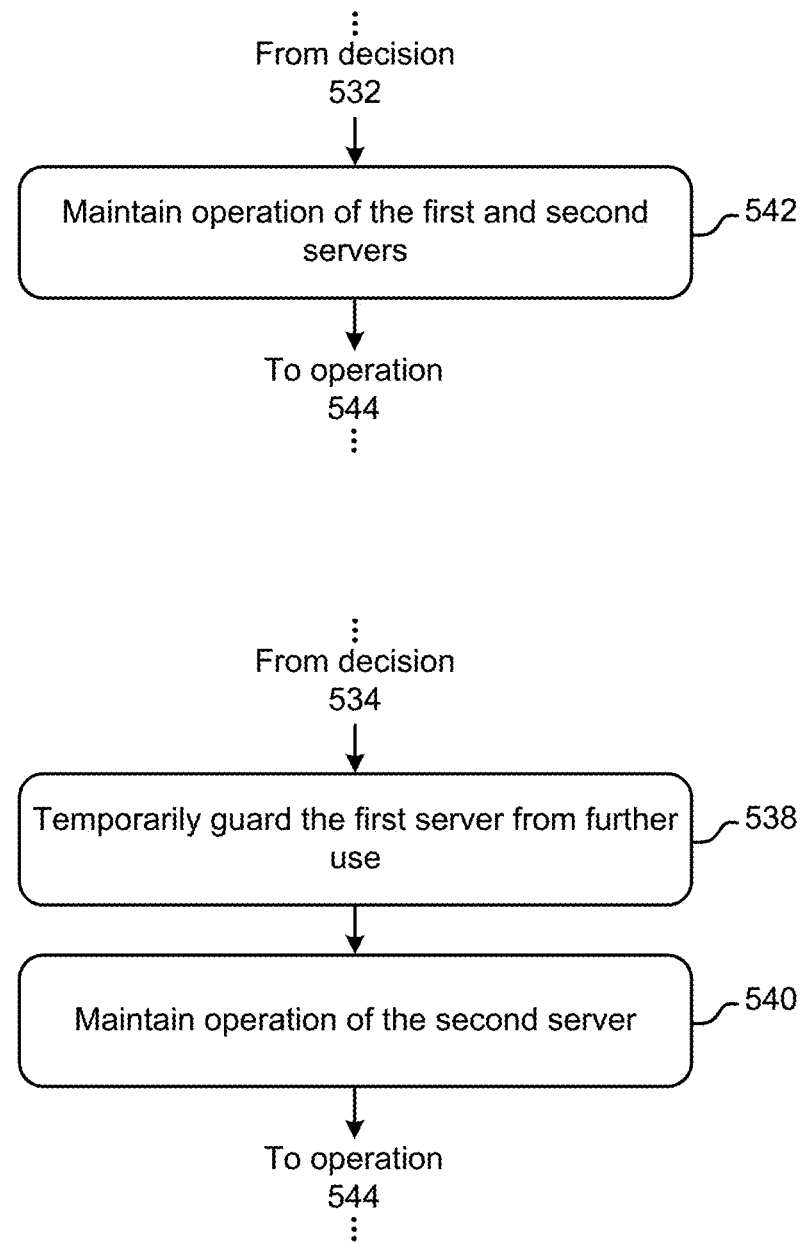

Referring now to FIG. 5, a flowchart of a method 500 for recovering from a write cache failure in a server is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, one or more of the processes included in method 500 may be performed by a server of a data storage system. In other embodiments, the method 500 may be partially or entirely performed by a controller, a processor, a computer, etc., or some other device having one or more processors therein. Thus, in some embodiments, method 500 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes experiencing a power loss event at a server. In some approaches, the power loss event may result from an unplanned occurrence, e.g., such as an electrical outage, unintentional decoupling from a power source, etc., while in other approaches the power loss event may result from a planned occurrence, e.g., such as a system reboot, a shutdown procedure, etc.

The type of server that experiences the power loss may also vary depending on the approach. For instance, in some approaches the server is a Central Electronics Complex (CEC) module which includes CPUs, processors RAM, Peripheral Component Interconnect (PCI) backplane, etc. In preferred approaches, the server is included in a data storage system which includes at least one other server, thereby forming a dual server data storage system. The at least two servers may be electrically coupled to each other using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description.

Each of the servers in the data storage system also preferably include volatile memory as well as non-volatile memory. It is preferred that the volatile memory and the non-volatile memory include RAM. For instance, in some approaches, the volatile memory includes a dual in-line memory module (DIMM) which contains a series of dynamic random access memory (DRAM) integrated circuits, e.g., as would be appreciated by one skilled in the art after reading the present description. Moreover, in some approaches the non-volatile memory is NVRAM which includes non-volatile dual in-line memory module (NVDIMM). However, the volatile memory and the non-volatile memory may include any desired type of memory components. The volatile memory and non-volatile memory may also be utilized differently depending on the desired approach, e.g., to form buffers, write caches, read caches, designated data storage locations, etc.

With continued reference to FIG. 5, method 500 proceeds to operation 504 in response to experiencing the power loss event. There, operation 504 includes resupplying power to the server. Accordingly, operation 504 includes resupplying power to the volatile memory and the non-volatile memory included in the server which experienced the power loss. Depending on the cause of the power loss, resupplying power to the server may involve remedying one or more issues. It should also be noted that the term "power" as used herein is in no way intended to be limiting and may refer to an operating voltage of the various components in the server, a minimum current, an electrical power rating, etc., depending on the desired approach.

As mentioned above, the volatile memory and/or the non-volatile memory may be utilized differently depending on the desired approach, e.g., to form buffers, write caches, read caches, designated data storage locations, etc. In preferred approaches, NVRAM in the non-volatile memory includes a write cache which is used to accumulate write operations which are to be performed on data stored in the overarching data storage system. In other words, write operations that are received at the storage system from users, running applications, other storage systems, etc., are accumulated in the write cache in the non-volatile memory of the server. Once placed in the write cache, these write operations are eventually satisfied in a same order they were received in, based on a predetermined algorithm, beginning with a most complex write operation, etc., depending on the approach.

Although power is restored to the server in operation 504, power loss can be a common failure mode for many types of electronic components that are actually included in the server, e.g., such as NVRAM. In other words, while the data stored in NVRAM itself may not be lost, physical components in NVRAM, e.g., such as a NVDIMM, may experience errors as a result of a supply power being cut. As a result, NVRAM may be unable to function properly even in response to being resupplied with power. Thus, decision 506 includes determining whether the non-volatile memory included in the server has experienced a failure event.

In some approaches decision 506 may be performed by attempting to access the non-volatile memory. For instance, one or more requests may be sent to the non-volatile memory which would normally illicit a response. Thus, a determination may be made that the non-volatile memory has experienced a failure event in response to determining that the one or more requests did not result in any responses from the non-volatile memory. In other approaches, the non-volatile memory and/or a controller coupled thereto may actually send a message that indicates the non-volatile memory has experienced a failure event.

In response to detecting that the NVRAM has not experienced a failure event as a result of the initial power loss, method 500 proceeds to operation 508 which includes commencing an IML sequence. With respect to the present description, an IML sequence is intended to represent a predetermined series of processes that are performed by a system upon being powered on. In other words, the IML sequence is used to initiate a system and prepare it for operation. For instance, the IML sequence may include allocating memory, establishing a write cache, conducting an inventory of physical components, etc. However, the term initial microcode load sequence (or "IML sequence" as used herein) is in no way intended to limit the invention. For instance, in other approaches this sequence may be referred to as an "initial microprogram load" sequence, an "initial machine load" sequence, etc., as would be appreciated by one skilled in the art after reading the present description.

From operation 508, the flowchart proceeds directly to decision 532, e.g., as will be described in further detail below. However, in response to detecting that the non-volatile memory has experienced a failure event, method 500 proceeds from decision 506 to operation 512. There, operation 512 includes temporarily guarding the non-volatile memory from further use. Because the non-volatile memory has experienced a failure event, it may no longer be able to be successfully utilized by the system. In order to repair the non-volatile memory, one or more of the components included therein may be replaced before regaining operational performance. Thus, by guarding the non-volatile memory from further use, operation 512 is effectively informing the system that it may not rely on the non-volatile memory, e.g., at least for the time being.

In some approaches the non-volatile memory may be guarded from further use by designating in the firmware (e.g., software) that the hardware included in the non-volatile memory has experienced a problem and therefore cannot be used until this hardware has been replaced. Some situations may dictate that an entire non-volatile memory module may itself be subject to replacement, while in other situations, only a subset of the components included in a non-volatile memory module may be marked for replacement.

Operation 514 further includes commencing an IML sequence. As noted above, the IML sequence is intended to represent a predetermined series of processes that are performed by a system upon being powered on. In other words, the IML sequence is used to initiate a system and prepare it for operation. For instance, the IML sequence may include allocating memory, establishing a write cache, conducting an inventory of physical components, etc.

While the IML sequence commenced in operation 514 may include the same or similar processes as those included in the IML sequence commenced in operation 508, it should be noted that the fact that the non-volatile memory has been guarded from further use may have some effects. For instance, at the point in the IML sequence that memory is allocated, a request may be sent to allocate the non-volatile memory as a write cache. However, because the non-volatile memory has been guarded from further use, a response that the allocation request has failed may be received following the allocation request.

Accordingly, memory allocation performed during the IML sequence commenced in operation 514 may utilize volatile memory rather than the non-volatile memory, e.g., as will be described in further detail below. It follows that one or more of the processes included in the IML sequence commenced in operation 514 may be adjusted based on the unavailability of the non-volatile memory as would be appreciated by one skilled in the art after reading the present description.

Proceeding to operation 516, a portion of volatile memory is allocated to serve as a temporary write cache. While it is preferred that the write cache is allocated using non-volatile memory to ensure data retention, it may not be available following a loss in power. While allocating the write cache using volatile memory may expose the data to retention issues, it desirably allows for the IML sequence to proceed, and potentially return the system to an operational state, e.g., as will be described in further detail below.

From operation 516, method 500 proceeds to operation 518 which includes indicating that the temporary write cache has been allocated from volatile memory. As noted above, while forming a write cache using volatile memory allows for the IML sequence to progress, it introduces data retention issues. Indicating that the temporary write cache has been allocated from volatile memory thereby informs users, the system, running applications, etc. that any write operations are exposed to some risk of being lost, e.g., as a result of another power loss. According to some approaches, operation 518 may include setting a microcode flag as a global code variable for the IML sequence. However, the indication may be made by updating metadata or by performing any other processes which would be apparent to one skilled in the art after reading the present description.

Operation 520 further includes clearing any data from the allocated portion of volatile memory. This allows for the allocated portion of volatile memory to be utilized as a temporary write cache, e.g., such that the IML sequence may further progress. It should also be noted that any valid data in the portion of volatile memory that has been allocated as the temporary write cache is preferably relocated prior to being cleared.

From operation 520, method 500 proceeds to decision 522 which includes determining whether any data was present in a write cache in the guarded non-volatile memory when the power loss was experienced. In other words, decision 522 includes determining whether any unperformed write operations were present in a write cache when the non-volatile memory experienced a failure event and went offline. By determining whether any such unperformed write operations exist in the write cache of the non-volatile memory, method 500 is able to identify situations where the data in storage has not been properly updated. Identifying these situations may thereby allow for the system to avoid experiencing failures stemming from data mismatches.

In some approaches determining whether any data was present in a write cache in the guarded non-volatile memory when the power loss was experienced may be performed by accessing metadata stored in memory. For instance, metadata that is maintained on storage enclosure drives of a data storage system may be updated to account for any data (e.g., write operations) that are currently present in the write cache. Moreover, the metadata may be stored as a snapshot, in a lookup table, as a log which includes each of the write operations received by the write cache, etc. It follows that this metadata may be accessed in order to perform decision 522.

However, determining whether any data was present in a write cache in the guarded non-volatile memory when the power loss was experienced may be performed differently depending on the approach. According to an example, which is in no way intended to limit the invention, a mirrored copy of the non-volatile memory may have been maintained at a backup location which may be accessed to determine the contents of the failed write queue.

Referring still to FIG. 5, in response to determining that data was not present in the write cache in the guarded non-volatile memory when the power loss was experienced, method 500 proceeds to decision 532, e.g., as will be described in further detail below. In other words, the flowchart proceeds from decision 522 to decision 532 in response to determining that there are not any unperformed write operations present in the guarded (e.g., inaccessible) write cache. In such situations, the data stored in memory accurately represents a current state of the system and is therefore not exposed to experiencing data mismatch errors.

Returning to decision 522, method 500 proceeds to operation 524 in response to determining that data was present in the write cache in the guarded non-volatile memory when the power loss was experienced. In other words, method 500 proceeds to operation 524 in response to determining that data is present in the write cache of the non-volatile memory. There, operation 524 includes identifying the data in memory which corresponds to the unperformed write operations in the write cache and marking the data as being invalid. As noted above, unperformed write operations may ultimately cause errors to occur because of data mismatching. Thus, the one or more volumes (e.g., files) which include the data which the unperformed write operations correspond to are preferably marked to prevent the system from experiencing any such errors. These volumes may be marked as having experienced data loss, being outdated, etc.

Moreover, operation 526 includes creating a serviceable event which indicates that data loss has been experienced by the one or more volumes that may have been marked in operation 524. Information corresponding to this serviceable event may be sent along with a warning which indicates that data loss has been experienced by the one or more marked volumes in the memory. See operation 528. In some approaches, the warning and/or information corresponding to the serviceable event may be sent to service personnel who are responsible for maintaining operation of the overarching system, e.g., such that appropriate action may be taken to repair the system. In other approaches the warning and/or information corresponding to the serviceable event may be sent to a user of the system such that use of the system may be modified to avoid experiencing any failures. It follows that this serviceable event is able to indicate that data loss has been experienced by certain volumes which may further be utilized by service personnel to determine there actually has been data loss. In response, this allows for service personnel to initiate a data loss recovery sequence (e.g., restoring data from a backup copy).

Accordingly, from operation 528 the flowchart proceeds to operation 530 whereby method 500 may end. However, it should be noted that although method 500 may end upon reaching operation 530, any one or more of the processes included in method 500 may be repeated in order to recover from other power losses. In other words, any one or more of the processes included in method 500 may be repeated for subsequently experienced losses in power and/or non-volatile memory failures.

However, looking to decision 532, a determination is made as to whether the write cache for the system has been allocated using volatile memory. In other words, decision 532 includes determining whether the write cache for the system is located in volatile memory, e.g., such as DIMM. As noted above, method 500 may proceed to decision 532 from different points along the flowchart of FIG. 5. For instance, in some instances a central storage controller performing the various processes included in FIG. 5 may advance directly to decision 532 from operation 508 in response to determining that the non-volatile memory included in the server has not experienced a failure event as a result of the power loss. In such instances, the IML sequence performed in operation 508 may have allocated a write cache using the non-volatile memory as desired. However, in other instances a central storage controller performing the various processes included in FIG. 5 may advance to decision 532 directly from decision 522 as an eventual response to determining that the non-volatile memory included in the server did experience a failure event as a result of the power loss. In such instances, the IML sequence performed in operation 514 may have allocated a write cache using the volatile memory.

Decision 532 may be performed in some approaches by examining a microcode flag that was set as a global code variable for the IML sequence that was performed (e.g., see operation 518 above). In other approaches, decision 532 may be performed by simply sending a request to the write cache and identifying the source of data received in response to the request.

In response to determining that the write cache for the system has been allocated using volatile memory, method 500 proceeds to decision 534. There, decision 534 includes determining whether to maintain operation of the system despite the temporary write cache being located in volatile memory. In other words, decision 534 determines whether the temporary write cache in the volatile memory should be maintained (e.g., used) while the non-volatile memory remains guarded from further use. In some instances, it is undesirable that volatile memory be used to process incoming write operations as volatile is susceptible to data loss in the event there is a cut in power. However, in other instances the continued operation of the system may outweigh the risk involved with utilizing the write cache in volatile memory.

The determination performed in decision 534 may be based on a predefined setting (e.g., code switch, flag, etc.) that has been set by a user. For instance, a user may prespecify whether continued operation of the system is more desirable than ensured data retention. In some approaches, this determination may be made based on the importance of the data stored in the system, the applications being run on the system, anticipated workloads while the write cache remains in volatile memory, etc.

In response to determining that the temporary write cache in the volatile memory should be maintained while the non-volatile memory remains guarded from further use, method 500 proceeds from decision 534 to operation 536. There, operation 536 includes maintaining operation of the first and second servers. As noted above, it is preferred that the various processes of method 500 are performed by a server that is included in a data storage system which includes at least one other server, thereby forming a dual server data storage system. Thus, in response to determining that a user wishes to maintain operation of the system despite the write cache being located in volatile memory, both servers preferably remain operational in order to maintain operation. In some approaches, operation 536 may include allowing the IML sequence to continue progressing.

However, in response to determining that the temporary write cache in the volatile memory should not be maintained while the non-volatile memory remains guarded from further use, method 500 proceeds from decision 534 to operation 538. There, operation 538 includes temporarily guarding the first server from further use, while operation 540 includes maintaining operation of the second server. As a result, the system may enter a single server operating state which may at least temporarily reduce performance thereof, e.g., until the non-volatile memory can be replaced and the system is able to return to a dual server operating state. In other words, the server which experienced the non-volatile memory failure is fenced using any processes which would be apparent to one skilled in the art after reading the present description. Moreover, despite one of the servers being fenced, the other server may be permitted to continue its respective IML sequence and eventually reach a single server operating state.

Returning momentarily to decision 532, method 500 proceeds to operation 542 in response to determining that the write cache for the system has not been allocated using volatile memory. As noted above, in some approaches a power loss may not result in the non-volatile memory experiencing a failure. The non-volatile memory may therefore be used to form the write cache. As shown, operation 542 includes maintaining operation of the first and second servers. Once again, it is preferred that the various processes of method 500 are performed by a server that is included in a data storage system which includes at least one other server, thereby forming a dual server data storage system. Thus, in response to determining that the write cache is desirably located in non-volatile memory, both servers preferably remain operational in order to maintain operation of the system.

The flowchart of FIG. 5 proceeds to operation 544 from each of operations 536, 540, and 542, whereby method 500 may end. However, at the completion of the foregoing sequence, the system may desirably remain in an available state and all volumes that have experienced data loss may be marked as such. Thus, the system may be in a state which is ready to begin the recovery sequence to restore the lost data from backup. Accordingly, service personnel are able to utilize the service events generated in method 500 to progress through a data loss recovery sequence regardless of availability of the non-volatile memory.

It should also be noted that although method 500 may end upon reaching operation 544, any one or more of the processes included in method 500 may be repeated in order to recover from other power losses. In other words, any one or more of the processes included in method 500 may be repeated for subsequently experienced losses in power and/or non-volatile memory failures.

It follows that by utilizing volatile memory to form a write cache following a non-volatile memory failure, the various processes described above with respect to method 500 are able to significantly reduce the amount of time involved with restoring data in the system. Moreover, systems are able to remain operational in some situations, thereby restoring functionality much more quickly than was previously achievable. In other words, by introducing a power loss and non-volatile memory failure response procedure that is able to detect data loss prior to replacing the failed non-volatile memory, some of the approaches herein are able to significantly improve the efficiency of the system. For instance, in many cases it may take hours or even days before a non-volatile memory replacement part is available, and therefore the processes included herein are able to avoid system downtime which would otherwise result from these replacement delays by beginning the data restoration process on the redundant storage controller in the system. This also desirably allows for host applications to restore operations as soon as possible.

It should also be noted that although method 500 has been illustrated as only advancing to decision 532 in situations where unperformed write operations were present in a write cache when the non-volatile memory experienced a failure event and went offline, this is in no way intended to limit the invention. For instance, in some approaches the system may continue to operate even in situations where one or more volumes in memory have been marked as including invalid data. In such approaches, a user may assume a risk of experiencing data mismatch errors until the non-volatile memory is repaired and any outstanding write operations are implemented, e.g., as would be appreciated by one skilled in the art after reading the present description.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 6:
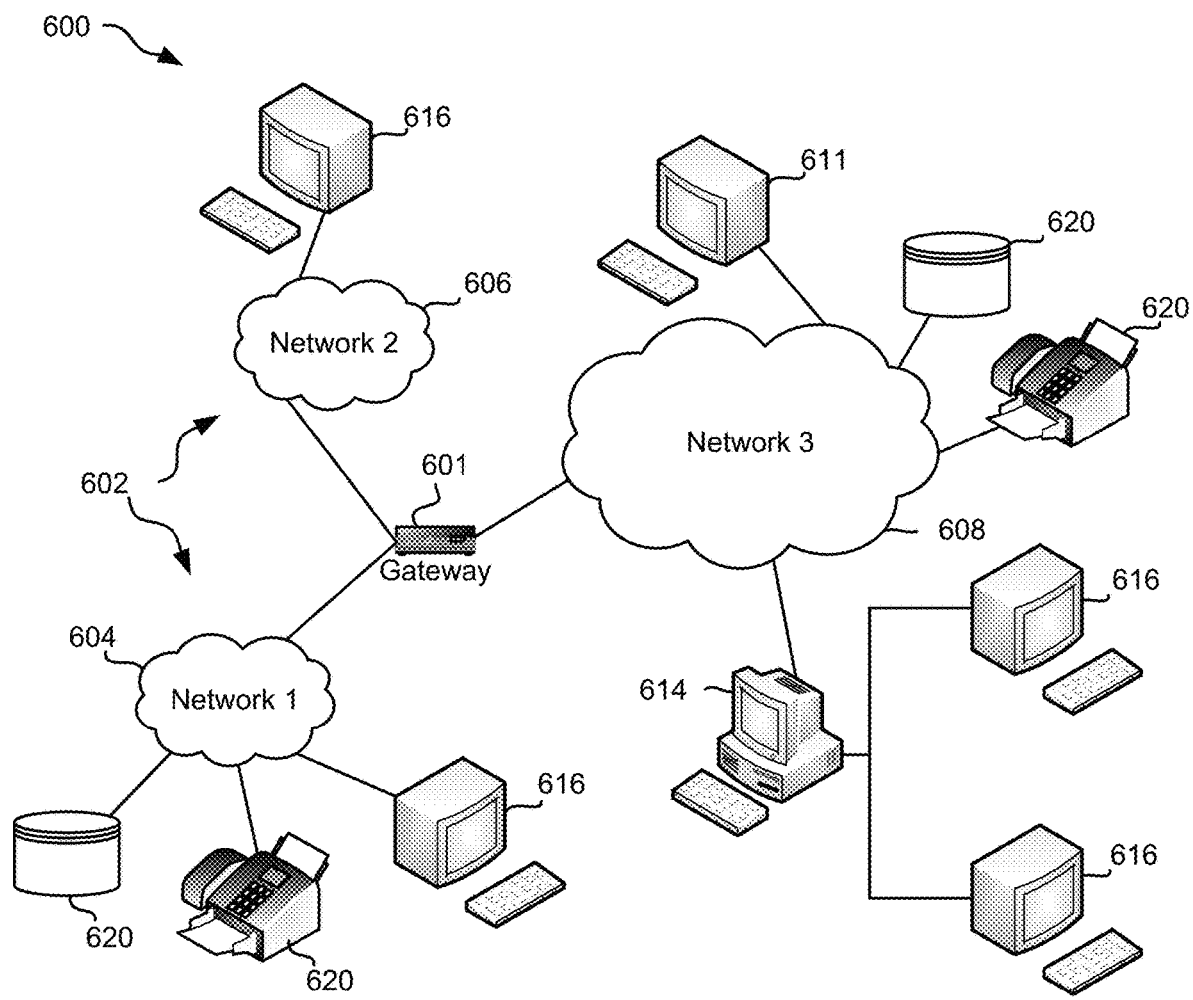
FIG. 6 is a network architecture, in accordance with one embodiment.

FIG. 6 illustrates a network architecture 600, in accordance with one embodiment. As shown in FIG. 6, a plurality of remote networks 602 are provided including a first remote network 604 and a second remote network 606. A gateway 601 may be coupled between the remote networks 602 and a proximate network 608. In the context of the present network architecture 600, the networks 604, 606 may each take any form including, but not limited to a LAN, a WAN such as the Internet, public switched telephone network (PSTN), internal telephone network, etc.

In use, the gateway 601 serves as an entrance point from the remote networks 602 to the proximate network 608. As such, the gateway 601 may function as a router, which is capable of directing a given packet of data that arrives at the gateway 601, and a switch, which furnishes the actual path in and out of the gateway 601 for a given packet.

Further included is at least one data server 614 coupled to the proximate network 608, and which is accessible from the remote networks 602 via the gateway 601. It should be noted that the data server(s) 614 may include any type of computing device/groupware. Coupled to each data server 614 is a plurality of user devices 616. Such user devices 616 may include a desktop computer, laptop computer, handheld computer, printer, and/or any other type of logic-containing device. It should be noted that a user device 611 may also be directly coupled to any of the networks, in some embodiments.

A peripheral 620 or series of peripherals 620, e.g., facsimile machines, printers, scanners, hard disk drives, networked and/or local data storage units or systems, etc., may be coupled to one or more of the networks 604, 606, 608. It should be noted that databases and/or additional components may be utilized with, or integrated into, any type of network element coupled to the networks 604, 606, 608. In the context of the present description, a network element may refer to any component of a network.

According to some embodiments, methods and systems described herein may be implemented with and/or on virtual systems and/or systems which emulate one or more other systems, such as a UNIX® system which virtually hosts a Microsoft® Windows® environment, etc. This virtualization and/or emulation may be enhanced through the use of VMware® software, in some embodiments.

In other embodiments, one or more networks 604, 606, 608, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 7:
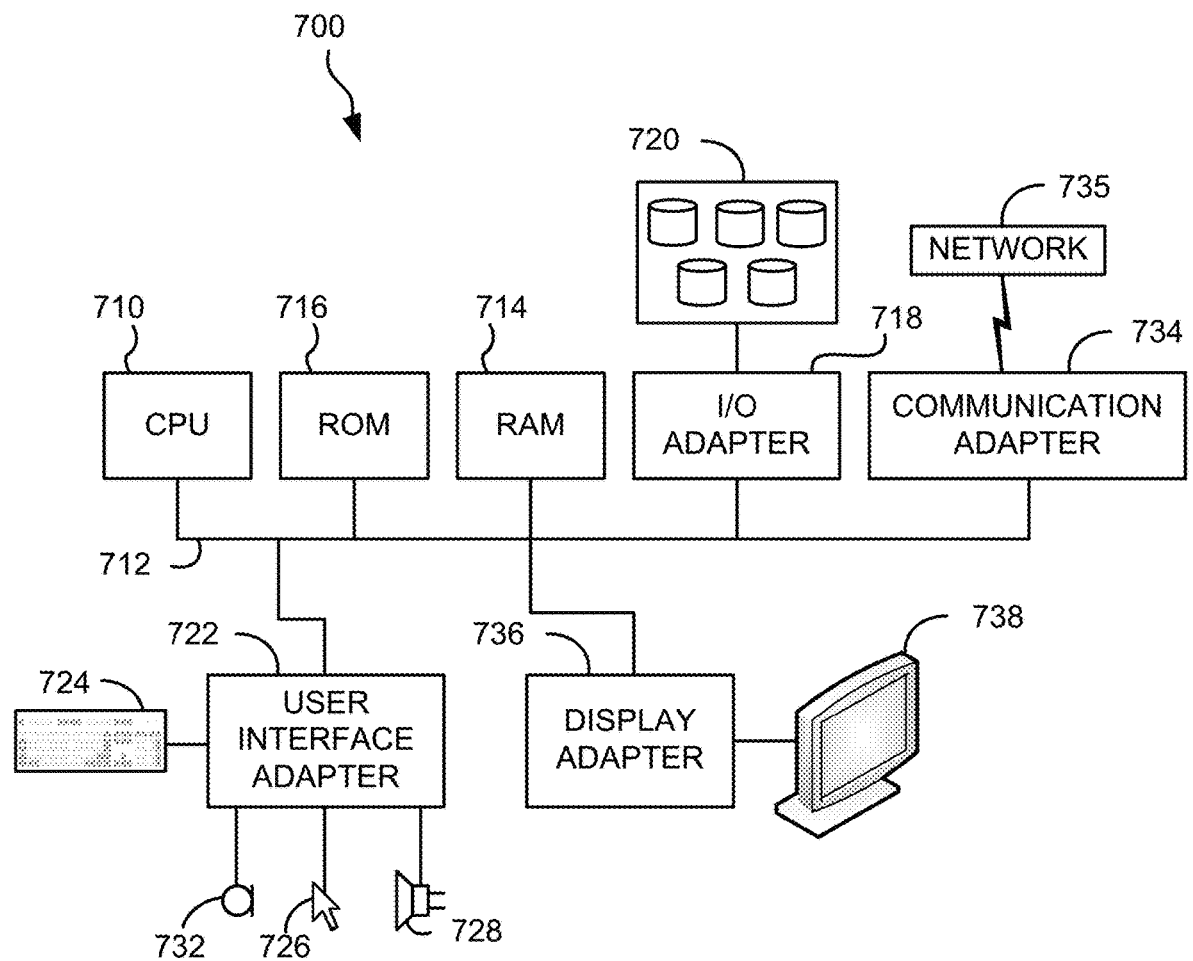
FIG. 7 is a representative hardware environment that may be associated with the servers and/or clients of FIG. 6, in accordance with one embodiment.

FIG. 7 shows a representative hardware environment associated with a user device 616 and/or server 614 of FIG. 6, in accordance with one embodiment. FIG. 7 illustrates a typical hardware configuration of a processor system 700 having a central processing unit 710, such as a microprocessor, and a number of other units interconnected via a system bus 712, according to one embodiment. In some embodiments, central processing unit 710 may include any of the approaches described above with reference to the one or more processors 210 of FIG. 2.

The processor system 700 shown in FIG. 7 includes a Random Access Memory (RAM) 714, Read Only Memory (ROM) 716, and an I/O adapter 718. According to some embodiments, which are in no way intended to limit the invention, I/O adapter 718 may include any of the approaches described above with reference to I/O adapter 218 of FIG. 2. Referring still to processor system 700 of FIG. 7, the aforementioned components 714, 716, 718 may be used for connecting peripheral devices such as storage subsystem 720 to the bus 712. In some embodiments, storage subsystem 720 may include a similar and/or the same configuration as data storage system 220 of FIG. 2. According to an example, which is in no way intended to limit the invention, storage subsystem 720 may include non-volatile data storage cards, e.g., having NVRAM memory cards, RAM, ROM, and/or some other known type of non-volatile memory, in addition to RAID controllers as illustrated in FIG. 2.

With continued reference to FIG. 7, a user interface adapter 722 for connecting a keyboard 724, a mouse 726, a speaker 728, a microphone 732, and/or other user interface devices such as a touch screen, a digital camera (not shown), etc., to the bus 712.

Processor system 700 further includes a communication adapter 734 which connects the processor system 700 to a communication network 735 (e.g., a data processing network) and a display adapter 736 which connects the bus 712 to a display device 738.

The processor system 700 may have resident thereon an operating system such as the Microsoft® Windows® Operating System (OS), a macOS®, a UNIX® OS, etc. It will be appreciated that a preferred embodiment may also be implemented on platforms and operating systems other than those mentioned. A preferred embodiment may be written using Java®, XML, C, and/or C++ language, or other programming languages, along with an object oriented programming methodology. Object oriented programming (OOP), which has become increasingly used to develop complex applications, may be used.

Figure 8:
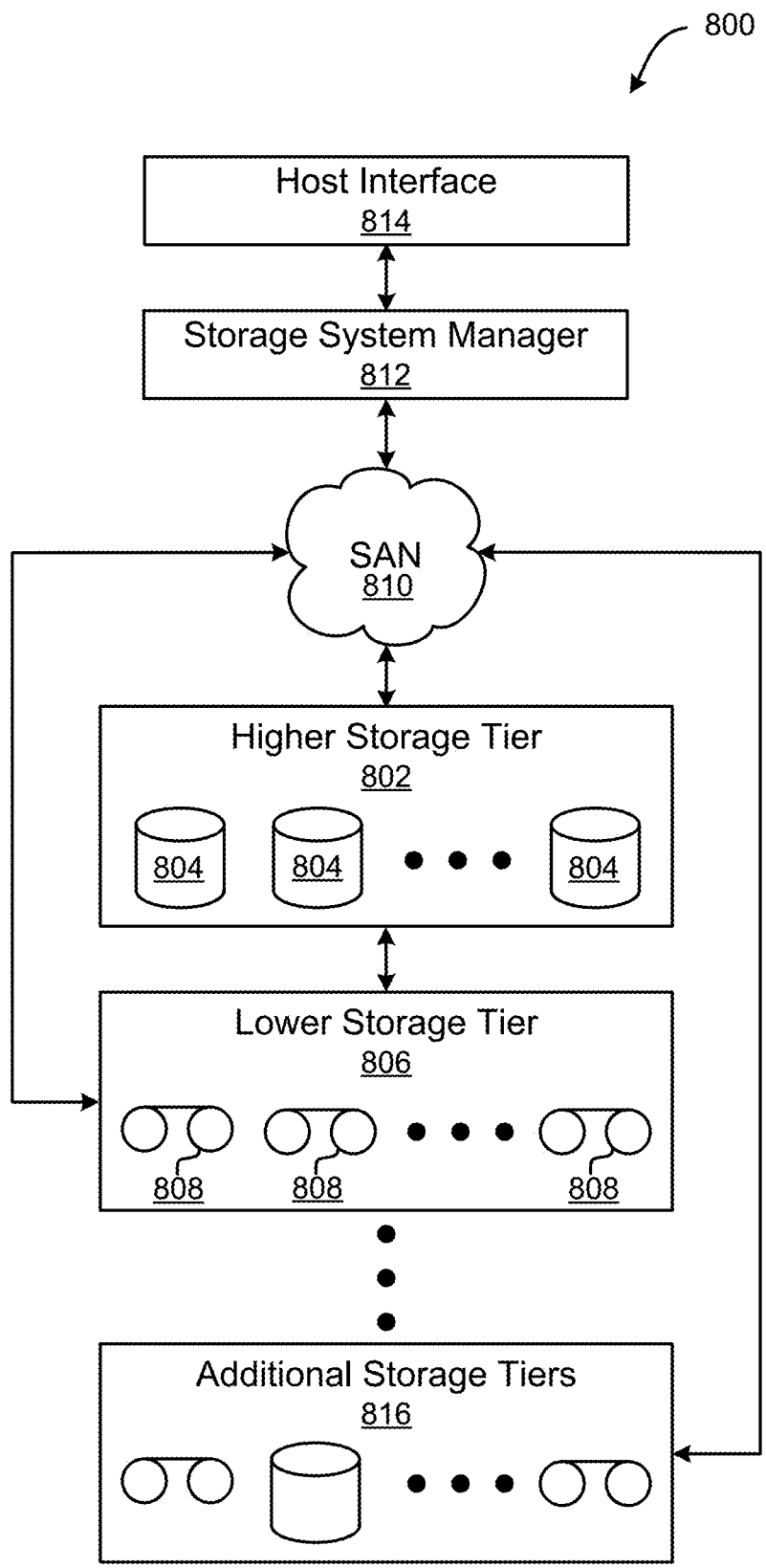
FIG. 8 is a diagram of a tiered data storage system in accordance with one embodiment.

Moreover, FIG. 8 illustrates a storage system 800 which implements high level (e.g., SSD) storage tiers in combination with lower level (e.g., magnetic tape) storage tiers, according to one embodiment. Note that some of the elements shown in FIG. 8 may be implemented as hardware and/or software, according to various embodiments. The storage system 800 may include a storage system manager 812 for communicating with a plurality of media on at least one higher storage tier 802 and at least one lower storage tier 806. However, in other approaches, a storage system manager 812 may communicate with a plurality of media on at least one higher storage tier 802, but no lower storage tier. The higher storage tier(s) 802 preferably may include one or more random access and/or direct access media 804, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 802 depending on the desired embodiment.

Referring still to FIG. 8, the lower storage tier(s) 806 preferably includes one or more lower performing storage media 808, including sequential access media such as magnetic tape in tape drives and/or optical media, slower accessing HDDs, slower accessing SSDs, etc., and/or others noted herein or known in the art. One or more additional storage tiers 816 may include any combination of storage memory media as desired by a designer of the system 800. Thus, the one or more additional storage tiers 816 may, in some approaches, include a SSD system architecture similar or the same as those illustrated in FIGS. 1-2. Also, any of the higher storage tiers 802 and/or the lower storage tiers 806 may include any combination of storage devices and/or storage media.

The storage system manager 812 may communicate with the storage media 804, 808 on the higher storage tier(s) 802 and lower storage tier(s) 806 through a network 810, such as a storage area network (SAN), as shown in FIG. 8, or some other suitable network type. The storage system manager 812 may also communicate with one or more host systems (not shown) through a host interface 814, which may or may not be a part of the storage system manager 812. The storage system manager 812 and/or any other component of the storage system 800 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 800 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 802, may include a majority of SSD storage media for storing data in a higher performing storage environment, and remaining storage tiers, including lower storage tier 806 and additional storage tiers 816 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 802, while data not having one of these attributes may be stored to the additional storage tiers 816, including lower storage tier 806. Of course, one of skill in the art, upon reading the present descriptions, may devise many other combinations of storage media types to implement into different storage schemes, according to the embodiments presented herein.

According to some embodiments, the storage system (such as 800) may include logic configured to receive a request to open a data set, logic configured to determine if the requested data set is stored to a lower storage tier 806 of a tiered data storage system 800 in multiple associated portions, logic configured to move each associated portion of the requested data set to a higher storage tier 802 of the tiered data storage system 800, and logic configured to assemble the requested data set on the higher storage tier 802 of the tiered data storage system 800 from the associated portions.

Of course, this logic may be implemented as a method on any device and/or system or as a computer program product, according to various embodiments.

What is claimed is:

1. A computer-implemented method, comprising:
   in response to experiencing a power loss event, resupplying power to non-volatile random access memory (NVRAM), wherein the NVRAM includes a write cache;
   in response to detecting that the NVRAM has experienced a failure event, temporarily guarding the NVRAM from further use;
   allocating a portion of volatile memory to serve as a temporary write cache;
   indicating that the temporary write cache has been allocated from volatile memory;
   clearing the allocated portion of volatile memory;
   determining whether data is present in the write cache in the NVRAM;
   in response to determining that data is present in the write cache in the NVRAM, marking one or more volumes in memory which correspond to the data present in the write cache in the NVRAM as having experienced data loss; and
   sending a warning which indicates that data loss has been experienced by the one or more marked volumes in the memory.

2. The computer-implemented method of claim 1, wherein determining whether data is present in the write cache in the NVRAM includes:

accessing metadata stored in the memory which indicates whether data was present in the write cache in the NVRAM when the power loss event was experienced.

3. The computer-implemented method of claim 1, wherein the processes are performed by a first server, wherein the first server is electrically coupled to a second server.

4. The computer-implemented method of claim 3, comprising:
determining whether the temporary write cache in the volatile memory should be maintained while the NVRAM remains guarded from further use; and
in response to determining that the temporary write cache in the volatile memory should be maintained while the NVRAM remains guarded from further use, maintaining operation of the first and second servers.

5. The computer-implemented method of claim 4, comprising:
in response to determining that the temporary write cache in the volatile memory should not be maintained while the NVRAM remains guarded from further use, temporarily guarding the first server from further use; and
maintaining operation of the second server.

6. The computer-implemented method of claim 1, wherein the NVRAM includes a non-volatile dual in-line memory module (NVDIMM).

7. The computer-implemented method of claim 6, wherein the volatile memory includes a dual in-line memory module.

8. The computer-implemented method of claim 1, wherein indicating that the temporary write cache has been allocated from volatile memory includes:
setting a microcode flag as a global code variable for an initial microcode load (IML) sequence.

9. A computer program product comprising a computer readable storage medium having program instructions embodied therewith, the program instructions readable and/or executable by a processor to cause the processor to:
in response to experiencing a power loss event, resupply, by the processor, power to non-volatile random access memory (NVRAM), wherein the NVRAM includes a write cache;
in response to detecting that the NVRAM has experienced a failure event, temporarily guard, by the processor, the NVRAM from further use;
allocate, by the processor, a portion of volatile memory to serve as a temporary write cache;
indicate, by the processor, that the temporary write cache has been allocated from volatile memory;
clear, by the processor, the allocated portion of volatile memory;
determine, by the processor, whether data is present in the write cache in the NVRAM;
in response to determining that data is present in the write cache in the NVRAM, mark, by the processor, one or more volumes in memory which correspond to the data present in the write cache in the NVRAM as having experienced data loss; and
send, by the processor, a warning which indicates that data loss has been experienced by the one or more marked volumes in the memory.

10. The computer program product of claim 9, wherein determining whether data is present in the write cache in the NVRAM includes:
accessing metadata stored in the memory which indicates whether data was present in the write cache in the NVRAM when the power loss event was experienced.

11. The computer program product of claim 9, wherein the processor is included in a first server, wherein the first server is electrically coupled to a second server.

12. The computer program product of claim 11, wherein the program instructions are readable and/or executable by the processor to cause the processor to:
determine, by the processor, whether the temporary write cache in the volatile memory should be maintained while the NVRAM remains guarded from further use; and
in response to determining that the temporary write cache in the volatile memory should be maintained while the NVRAM remains guarded from further use, maintain, by the processor, operation of the first and second servers.

13. The computer program product of claim 12, wherein the program instructions are readable and/or executable by the processor to cause the processor to:
in response to determining that the temporary write cache in the volatile memory should not be maintained while the NVRAM remains guarded from further use, temporarily guard, by the processor, the first server from further use; and
maintain, by the processor, operation of the second server.

14. The computer program product of claim 9, wherein the NVRAM includes a non-volatile dual in-line memory module (NVDIMM).

15. The computer program product of claim 14, wherein the volatile memory includes a dual in-line memory module.

16. The computer program product of claim 9, wherein indicating that the temporary write cache has been allocated from volatile memory includes:
setting a microcode flag as a global code variable for an initial microcode load (IML) sequence.

17. A system, comprising:
a plurality of non-volatile random access memory (NVRAM) blocks configured to store data;
a processor; and
logic integrated with and/or executable by the processor, the logic being configured to:
in response to experiencing a power loss event, resupply, by the processor, power to non-volatile random access memory (NVRAM), wherein the NVRAM includes a write cache;
in response to detecting that the NVRAM has experienced a failure event, temporarily guard, by the processor, the NVRAM from further use;
allocate, by the processor, a portion of volatile memory to serve as a temporary write cache;
indicate, by the processor, that the temporary write cache has been allocated from volatile memory;
clear, by the processor, the allocated portion of volatile memory;
determine, by the processor, whether data is present in the write cache in the NVRAM;
in response to determining that data is present in the write cache in the NVRAM, mark, by the processor, one or more volumes in memory which correspond to the data present in the write cache in the NVRAM as having experienced data loss; and
send, by the processor, a warning which indicates that data loss has been experienced by the one or more marked volumes in the memory.

18. The system of claim 17, wherein determining whether data is present in the write cache in the NVRAM includes:

accessing metadata stored in the memory which indicates whether data was present in the write cache in the NVRAM when the power loss event was experienced.

19. The system of claim 17, wherein the processor is included in a first server, wherein the first server is electrically coupled to a second server, wherein the logic is configured to:
- determine, by the processor, whether the temporary write cache in the volatile memory should be maintained while the NVRAM remains guarded from further use;
- in response to determining that the temporary write cache in the volatile memory should be maintained while the NVRAM remains guarded from further use:
  - maintain, by the processor, operation of the first and second servers; and
- in response to determining that the temporary write cache in the volatile memory should not be maintained while the NVRAM remains guarded from further use:
  - temporarily guard, by the processor, the first server from further use, and maintain, by the processor, operation of the second server.

20. The system of claim 17, wherein the NVRAM includes a non-volatile dual in-line memory module (NVDIMM), wherein the volatile memory includes a dual in-line memory module.

* * * * *